(12) United States Patent
Gray

(10) Patent No.: US 6,765,155 B1
(45) Date of Patent: Jul. 20, 2004

(54) FISH MEASURING AND WEIGHTING DEVICE

(76) Inventor: Alvin D Gray, P.O. Box 269, Wessington Springs, SD (US) 57382

( * ) Notice: Subject to any disclaimer, the term of this patent is extended or adjusted under 35 U.S.C. 154(b) by 140 days.

(21) Appl. No.: 10/087,956

(22) Filed: Mar. 4, 2002

(51) Int. Cl.[7] ............................ G01G 19/52; G01B 1/00
(52) U.S. Cl. ......................... 177/148; 177/177; 33/485; 33/511; 33/549; 43/4
(58) Field of Search ................................. 177/131, 148, 177/149, 177, 245; 33/485, 511, 549; 43/4

(56) References Cited

U.S. PATENT DOCUMENTS

| | | | | |
|---|---|---|---|---|
| 2,603,474 A | * | 7/1952 | Mandolf et al. | ............ 177/126 |
| 4,631,851 A | | 12/1986 | Whitehurst | ...................... 43/7 |
| 4,696,360 A | | 9/1987 | Homen | ....................... 177/262 |
| 4,936,399 A | | 6/1990 | Christman et al. | ...... 177/210 C |
| 5,031,710 A | | 7/1991 | Parker et al. | .......... 177/210 FP |
| 5,097,617 A | * | 3/1992 | Craven | ............................. 43/4 |
| 5,148,607 A | | 9/1992 | Lasiter | ........................ 33/549 |
| 5,178,227 A | | 1/1993 | Kvisgaard et al. | .......... 177/145 |
| 5,339,532 A | | 8/1994 | O'Keefe | ....................... 33/511 |
| 5,526,575 A | * | 6/1996 | Hoover et al. | ................ 33/485 |
| 5,637,838 A | | 6/1997 | Arey et al. | .................. 177/148 |
| 6,094,996 A | | 8/2000 | Campbell et al. | ........... 177/245 |
| 6,115,932 A | | 9/2000 | Fedora | ........................ 33/758 |
| 6,415,521 B1 | * | 7/2002 | Schnell | ........................ 33/511 |
| 6,429,391 B1 | * | 8/2002 | Gruver | ....................... 177/148 |
| 6,594,939 B2 | * | 7/2003 | Ondusko | .......................... 43/4 |
| 6,608,261 B2 | * | 8/2003 | Thadani | ..................... 177/126 |

FOREIGN PATENT DOCUMENTS

| | | |
|---|---|---|
| FR | 2582190 | 11/1986 |
| GB | 2255486 A | 11/1992 |

OTHER PUBLICATIONS

U.S. patent application Publication US 2003/0106254 A1 (Ondusko) Jun. 12, 2003.*

* cited by examiner

Primary Examiner—Randy W. Gibson
(74) Attorney, Agent, or Firm—Michael I. Kroll

(57) ABSTRACT

The present invention 10 discloses a device that allows a fisherman 12 to measure and weight their catch 14 to determine if they are of legal size or a throw back. The device of the present invention consists of a plastic housing 16, including a carrying handle 18. A measuring ruler 20 is stenciled upon the horizontal face of the device and is used to measure the user's catch. On the opposing rear wall is a pictorial display of game fish 22 with information on size, and weight restrictions of different species as dictated by local authority. A weight scale 42 is provided and housed within an end wall 24 having an access panel 40. A hook chain device 36 is also provided and consists of a hook 44 attached to one distal end of the chain 46 and another hook 44 attached to the other distal end of the chain 46 stored within the weight scale compartment 26. One end hook 44 of the chain device 46 is attached to a loop 38 on the weight scale plate 52. The other hook end 44 is used to attach to the catch 14 for purpose of weighting. Two display units 30 are provided and will show the weight of the catch on the display windows. Above the weight scale compartment 26, within the housing 16 of the device, a battery compartment 28 is provided. The batteries 29 power a nightlight 32 that is provided on the opposing wall of the battery compartment 28. An on/off switch 32 to engage the nightlight 32 is provided above the sidewall display unit of the housing. The device may also be provided with attachable legs 50.

8 Claims, 10 Drawing Sheets

FISH MEASURING AND WEIGHTING DEVICE

BACKGROUND OF THE INVENTION

1. Field of the Invention

The present invention relates generally to sporting equipment and more specifically to a device that allows a fisherman to measure and weight their catch to determine if they are of legal size or a throw back. The device of the present invention consists of a plastic housing, including a carrying handle. A measuring ruler is stenciled upon the horizontal face of the device and is used to measure the users catch. On the opposing rear wall is a pictorial display of game fish with information on size, and weight restrictions of different species as dictated by local authority. A weight scale is provided and housed within an end wall having an access panel. A hook chain device is also provided and consists of a hook attached to one distal end of the chain and another hook attached to the other distal end of the chain and also, stored within the weight scale compartment. One end hook of the chain device is attached to a loop on the weight scale plate. The other hook end is used to attach to the catch for purpose of weighting. Two display units are provided and will show the weight of the catch on the display windows. Two display windows make reading of the weight easy from different angles. Above the weight scale compartment, within the housing of the device, a battery compartment is provided. The batteries stored within power a night light that is provided on the opposing wall of the battery compartment. An on/off switch to engage the nightlight is provided above the sidewall display unit of the housing.

The device of the present invention can be used on shore or mounted on a boat. The device may also be provided with attachable legs, also for on shore and aboard a boat.

2. Description of the Prior Art

There are other weight and size devices designed to measure fish. Typical of these is U.S. Pat. No. 4,631,851 issued to Whitehurst on Dec. 30, 1986.

Another patent was issued to Homen on Sep. 29, 1987 as U.S. Pat. No. 4,696,360. Yet another U.S. Pat. No. 4,936,399 was issued to Christman, et al. on Jun. 26, 1990 and still yet another was issued on Jul. 16, 1991 to Parker et al. as U.S. Pat. No. 5,031,710.

Another patent was issued to Lasiter on Sep. 22, 1992 as U.S. Pat. No. 5,148,607. Yet another patent was issued to Kvisgaard, et al. on Jan. 12, 1993 as U.S. Pat. No. 5,178,227 and still yet another was issued to O'Keefe on Aug. 23, 1994 as U.S. Pat. No. 5,339,532.

Another patent was issued to Arey, et al. on Jun. 10, 1997 as U.S. Pat. No. 5,637,838. Yet another patent was issued to Campbell, et al. on Aug. 1, 2000 as U.S. Pat. No. 6,094,996.

Another patent was issued to Fedora on Sep. 12, 2000 as U.S. Pat. No. 6,115,932. Yet another patent was issued to Chat on Nov. 28, 1986 as FR Patent No. 2582190 and still yet another was issued as UK patent 2255486 on Nov. 11, 1992 to Barnett.

U.S. Pat. No. 4,631,851

Inventor: Wendell Whitehurst

Issued: Dec. 30, 1986

A combination fish landing net, weight scale, and length scale for use by fishermen to obtain accurate fresh weight and length measurements of a captured fish immediately after netting. A flexible mesh net is secured upon a generally circular, tubular hoop. A rigid plug secured in the interior of the hoop by a pair of screws may be removed to permit removal and replacement of a damaged net. The compressed hoop ends are secured by a rigid rivet to one end of an expansible, steel spring and fitted in coaxial relation into the interior of a rigid, phosphorescent, plastic tube. The spring is secured within the tube by a rigid pin. A pair of parallel rectangular clearance slots are cut in opposite sides of the tube. The tube is coaxially, telescopingly fitted within a rigid, elongated, tubular handle of a highly contrasting color. A rigid steel fastener passes through the handle between the clearance slots of the tube to capture the opposite end of the spring. The device can thus be assembled without tensioning of the spring. Downward movement of the highly visible intermediate tube within the handle in response to the weight of a netted fish is visible through a pair of parallel, elongated, rectangular windows on the face of the handle. Length may be measured by numerical weight scale calibrations legible on the surface of the handle between the windows. When the device is correctly assembled, the hoop rests in coplanar alignment with the rivet, the pin, the fastener, and the windows. A length scale is provided on the rear face of the handle to permit the fisherman to obtain an accurate length measurement without having to remove the fish from the net.

U.S. Pat. No. 4,696,360

Inventor: Manny Homen

Issued: Sep. 29, 1987

An improved weighing apparatus and method of weighing a live fish is disclosed. Here, the weighing apparatus and method has a container member having swingably coupled cover member thereabove and a guide member coupled therebelow a base member of the container. The guide member of the container is provided to allow the container to be slidably mounted thereabove a weighing scale having a capacity to provide a weight readout to nearest one-tenth of an ounce and a maximum capacity of at least 200 ounces. The weighing scale of the improved weighing apparatus of the present invention is preferably battery operated or suitable for being electrically operated, as well as being compact, portable, lightweight and easily transportable. The improved weighing apparatus and method of the present invention provides a rapid, accurate and efficient means to weigh a struggling live fish for use particularly by sports fisherman in fishing tournaments or for merchants in fishing markets.

U.S. Pat. No. 4,936,399

Inventor: Richard E. Christman

Issued: Jun. 26, 1990

A scale arranged and constructed of relatively small size to be hand held and portable for use in weighing relatively light articles such as fish and the like. The scale operates on a capacitance measuring concept wherein an initial capacitance between two conductive, spaced and insulated plates is measured with a change in distance between the two plates caused by a load is measured and, through a logic circuit, converted to a digital read-out. The capacitance sensor unit for the measuring of the capacitance caused by the load includes a stationary plate and a moveable plate insulated from each other with proper leads connecting the plates to the logic circuit. The entire capacitance measuring device is provided in a sandwiched arrangement to provide a small and compact unit. The logic circuitry provides for digital readout and provides automatic zeroing.

U.S. Pat. No. 5,031,710

Inventor: Owen Parker et al.

Issued: Jul. 16, 1991

An electronic fish scale having a spring connected to a hook to which the fish or other item to be weighed is attached. Attaching the weight to the hook causes linear displacement of the spring. A rigid coupling is attached to the spring and connected to a variable resistor such that movement of the spring results in a change in the effective resistance of the variable resistor. Electronic circuitry is interconnected with the variable resistor such that a signal is generated which is indicative of the effective resistance of the variable resistor. The generated signal is sampled and processed at a microprocessor having all stored data corresponding to the weight equivalent to the variance in the variable resistor-dependent signal. A display receives a signal output from the microprocessor and displays and weight measured.

U.S. Pat. No. 5,148,607

Inventor: Rupert W. Lasiter

Issued: Sep. 22, 1992

A device for simultaneously holding and measuring the length of a fish, generally comprising a rectangular tray open at one end, the tray having a bottom, two side walls and one end wall, and a preferably hinged lid with a releasable latch. The length of the tray is made equal to the minimum legal length established for the type of fish with which the device is to be used. The length of the lid is less than the length of the bottom of the tray and the lid is disposed on the tray with one end of the lid generally aligned with the closed end of the tray, such that a portion of the bottom of the tray adjacent to the open end is not covered by the lid. A fish is placed in the device with its nose against the end wall at the closed end of the tray, and the lid is closed to loosely retain the fish the device. If the tail of the fish extends outwardly beyond the open end of the tray the fish is of legal size and may be retained by the fisherman.

U.S. Pat. No. 5,178,227

Inventor: Thorkild Kvisgaard

Issued: Jan. 12, 1993

For obtaining accurate product weighing results in ships it is not sufficient to effect a correction of the weighing results by an accelerometer, which will only roughly compensate for the weighing errors due to the general movements in the sea. Thus correction are also effected for errors from other marked sources of error, so that it is possible to stake on a large-scale rearrangement of the fish industry from land-based to ship-based plants. Thus, corrections are made for errors due to tiltings of the ship and due to the mechanical noise produced by the engine of the ship or by operative implements on the ship. A calibration of the weighing system is carried out regularly by a calibration system which is effective even during movements in the sea. Moreover, the weighing system, which is passed by a weighing belt, is subdivided in three mutually independent weighing units, whereby usable weighing results are obtainable also by occurring weighing noise impacts, even if one of the weightings should be unacceptable.

U.S. Pat. No. 5,339,532

Inventor: John G. O'Keefe

Issued: Aug. 23, 1994

A fish measuring device is described which has a fish support surface with a length, width and first and second ends opposite one another. A stop at the first end prevents movement of a fish lengthwise beyond the first end and at least two fish restraining members at least partially along the length of the fish support surface partially enclose or envelope an interior space with the fish support surface. A passage exists between the two fish restraining members to permit a fishing line and/or thumb and forefinger holding a fish to be brought therethrough to the stop. A live fish may be brought into the device while still hooked via the line or after being unhooked. While the fish is restrained in its movement, its length may be compared against the end of the support surface or a scale therein to determine its length.

U.S. Pat. No. 5,637,838

Inventor: Clyde D. Arey et al.

Issued: Jun. 10, 1997

An apparatus for measuring, weighing and counting fish comprising a main body portion having long parallel side edges and short parallel upper and lower edges in a rectangular configuration, the main body portion having a front face and a back face and a slot for the receipt of a slidable member therein, the main body portion also having a recess centrally formed in the upper face thereof in a generally inverted V-shaped configuration with a ledge, the apex of the V being adapted to receive the head of a fish to be measured; a generally rectangular slide member positionable within the slot of the main body portion, the slide member being in a generally L-shaped configuration with a long portion slidably positioned within the slot of the main body portion and with a short portion at right angles with respect thereto adjacent the lower edge of the main body portion adapted to receive the tail of the fish to be measured, the slide member having indicia as to a fish length formed adjacent to the front face thereof, the indicia formed in a linear array and with notches formed in the side edges of the slide member; and adjustable coupling members formed adjacent to the lower edge of the main body portion at a side thereof, the coupling members including a hinge member and, on one side thereof, a projection extending through an adjacent wall of the main body portion into a pre-selected notch in the slide member to lock the slide member with respect to the main body portion, the adjustable members including a spring and recesses to urge the projection into a pre-selected selected side notch.

U.S. Pat. No. 6,094,996

Inventor: Bruce H. Cambell et al.

Issued: Aug. 1, 2000

An apparatus and method that electronically measures and displays the size of a fish in a net using an electrical transducer generating a signal responding to the weight of a fish, and electronics converting and displaying the signal to indicate fish weight, length, and/or girth to inform a person of fish size with minimum trauma to a fish.

U.S. Pat. No. 6,115,932

Inventor: Brian S. Fedora

Issued: Sep. 12, 2000

A multi layered adhesive backed fish ruler construction 10 for attachment to a substrate 100 such as a cooler or a flat surface on a fishing boat. The construction 10 comprises a bottom layer including an elongated thin flat strip of plastic material 40 fixedly secured to substrate 100 and provided with both luminous length indicia 22 and various fish silhouette indicia 23 and one or more generally similar overlying strips of plastic material 30 and 40 releasably secured to one another and to the bottom strip of plastic material 40.

FR Patent Number 2582190

Inventor: Jean-Louis Chat

Issued: Nov. 28, 1986

Invention allowing fish to be measured with the aid of a gauge, whatever the orientation of the fish in the gauge having to touch the fish either to measure it or to remove the hook. It consists of a gutter having two end stops A and which serves as an orifice with two graduations C and D. The gauge is fixed to the bottom of the netting part of a landing net by the use of holes F. The measurement of the fish is done by bringing the nose of the fish to one end stop and by reading its length on the graduation. By clamping the fish between the gauge and the netting of the landing net, it is possible to remove the hook.

UK Patent Number 2255486

Inventor: Bernard Thomas Barnett

Issued: Nov. 11, 1992

A bag for containing a fish has marks to indicate the girth of the fish and marks to indicate the length of the fish.

SUMMARY OF THE PRESENT INVENTION

The present invention discloses a device that allows a fisherman to measure and weight their catch to determine if they are of legal size or a throw back. The device of the present invention consists of a plastic housing, including a carrying handle. A measuring ruler is stenciled upon the horizontal face of the device and is used to measure the user's catch. On the opposing rear wall is a pictorial display of game fish with information on size, and weight restrictions of different species as dictated by local authority. A weight scale is provided and housed within an end wall having an access panel. A hook chain device is also provided and consists of a hook attached to one distal end of the chain and another hook attached to the other distal end of the chain stored within the weight scale compartment. One end hook of the chain device is attached to a loop on the weight scale plate. The other hook end is used to attach to the catch for purpose of weighting. Two display units are provided and will show the weight of the catch on the display windows. Above the weight scale compartment, within the housing of the device, a battery compartment is provided. The batteries power a nightlight that is provided on the opposing wall of the battery compartment. An on/off switch to engage the nightlight is provided above the sidewall display unit of the housing. The device may also be provided with attachable legs.

A primary object of the present invention is to provide a device for the measuring and weighting fish.

Another object of the present invention is to provide a device for the measuring and weighting fish that provides a nightlight and a battery as a source of power.

Yet another object of the present invention is to provide a device for the measuring and weighting fish that provides a measuring ruler stenciled upon the horizontal face of the device and is used to measure the users catch.

Still yet another object of the present invention is to provide a device for the measuring and weighting fish that provides a weighting scale that is located within its provided compartment and is used to weight the users catch.

Yet another object of the present invention is to provide a device for the measuring and weighting fish that provides a chain and hook device that attaches to the weighting scales loop and is used to attach to the catch for weighting.

Additional objects of the present invention will appear as the description proceeds.

The present invention overcomes the shortcomings of the prior art by providing a device for the measuring and weighting fish that is portable and can be attached to a boat.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claim

LIST OF REFERENCE NUMERALS

Figure 1:
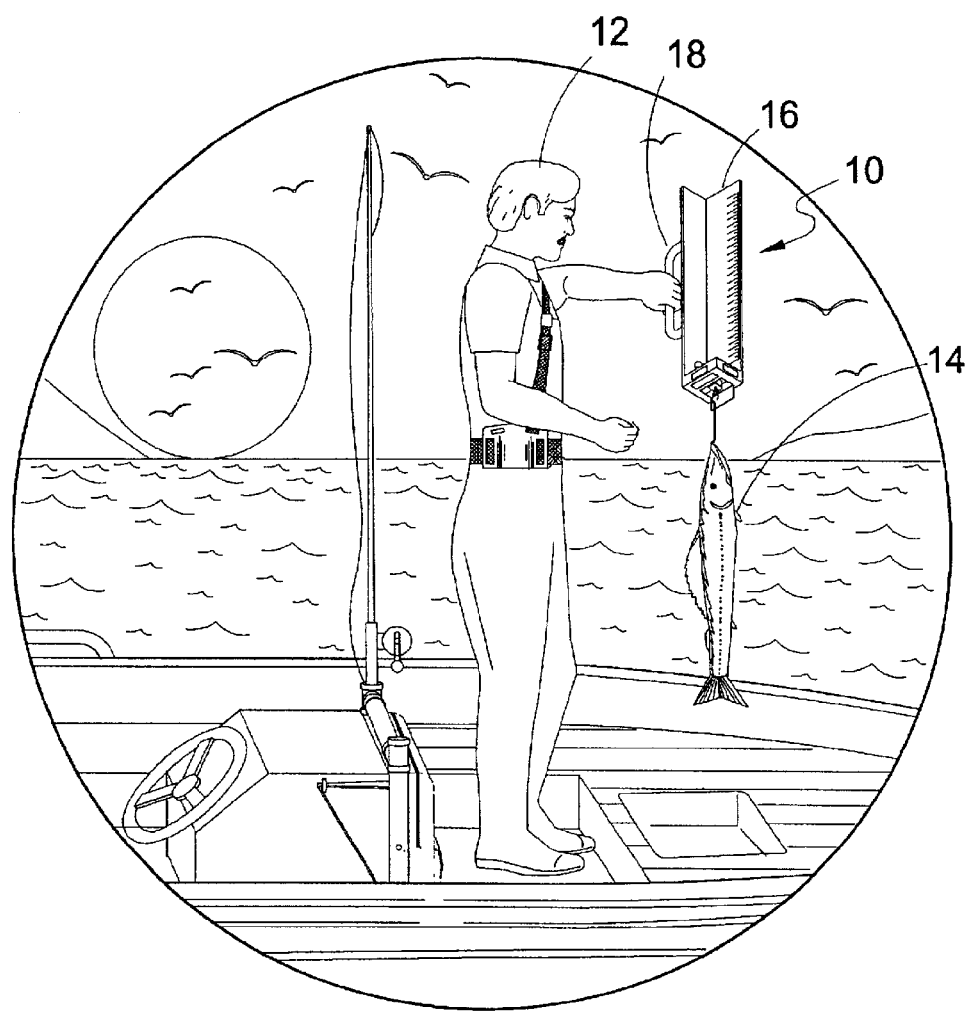
FIG. 1 is an illustrative view of the present invention in use.

With regard to reference numerals used, the following numbering is used throughout the drawings.

10 present invention
12 user
14 fish
16 housing
18 handle
20 measuring scale
22 pictures
24 end wall
26 weight scale compartment
28 battery compartment
29 battery
30 weight read out display
32 nightlight
34 nightlight switch
36 weighting hook
38 holder loop
40 access door
42 weighting scale
44 hook
46 hook line
48 electrical wire
50 legs
52 weight scale plate

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention is a device that allows a fisherman user 12 to measure and weight their fish catch 14 to determine if they are of legal size or a through back. The device consists of a plastic housing 16 with an attached handle 18 for easy manipulation of the device, nightlight, and switch, weight scale and measuring scale. It is a portable device that can be used on shore, on a dock or on a boat.

Figure 2:
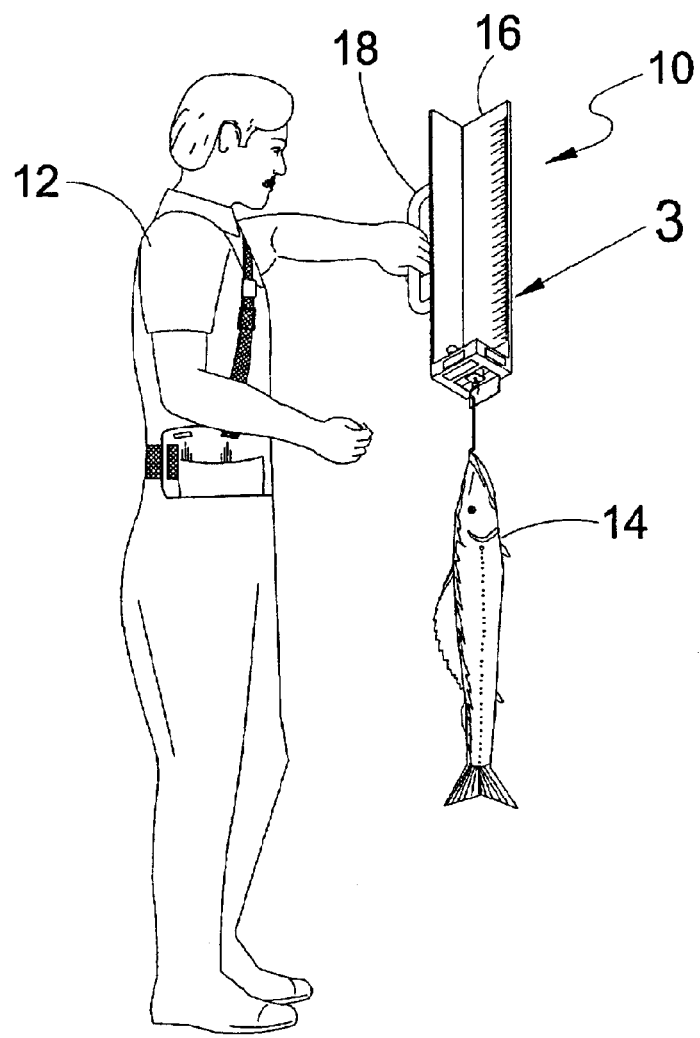
FIG. 2 is an illustrative view of the present invention in use.

Turning to FIG. 2, shown therein is an illustrative view of the present invention 10 in use. The present invention is a device that allows a fisherman 12 to measure and weight their fish catch 14 to determine if they are of legal size or a through back. The device consists of a plastic housing 16 with an attached handle 18 for easy manipulation of the device, nightlight, and switch, weight scale and measuring scale. It is a portable device that can be used on shore, on a dock or on a boat.

Figure 3:
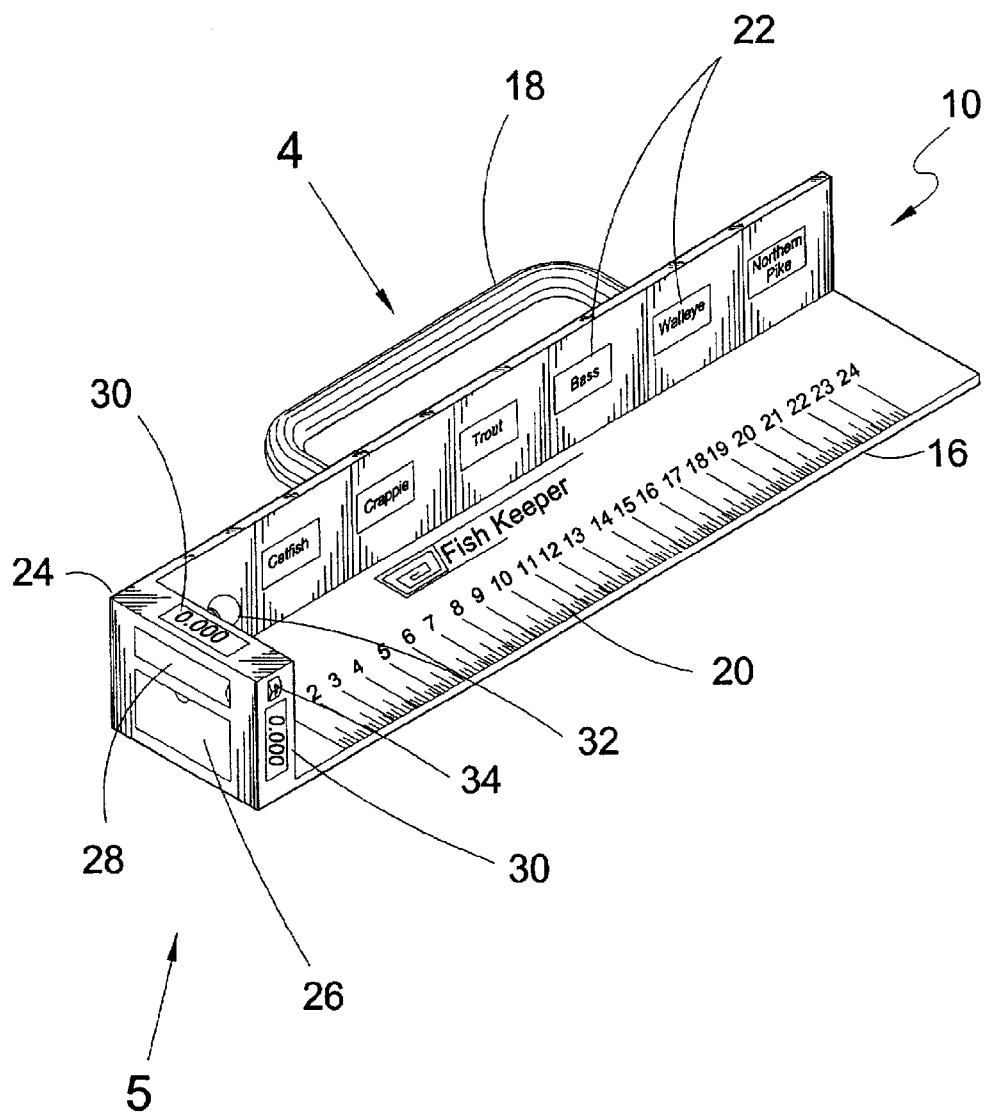
FIG. 3 is a perspective view of the present invention.

Turning to FIG. 3, shown therein is a perspective view of the present invention 10. The present invention provides a measuring scale or ruler 20 stenciled upon the horizontal face of the device and is used to measure the user's catch length. On the vertical wall, extending from one distal end of the flat measuring portion are pictures 22 or indicia of the user's favorite catch being displayed which can provide limit size and weight of each different species as pertaining to the restrictions of the area fished. Also shown is an end wall 24 on one end of housing 16 containing a weight scale compartment 26 containing means for weighting, a battery power supply compartment 28, a pair of weight scale read out displays 30, a nightlight 32 with light switch 34 and handle 18. It can be seen that the housing 16 is L-shaped having a generally horizontal face and a generally vertical face thereon, wherein the horizontal face has a first and second end, and a topside and an underside, and the vertical face has a frontside and a rearside where the handle 18 is disposed, Also, the end wall 24 is disposed on one end of the housing wherein the end wall has an inner face where the night light 32 is disposed and outer face, and an upper edge and a front edge as shown where the two readouts are disposed.

Figure 4:
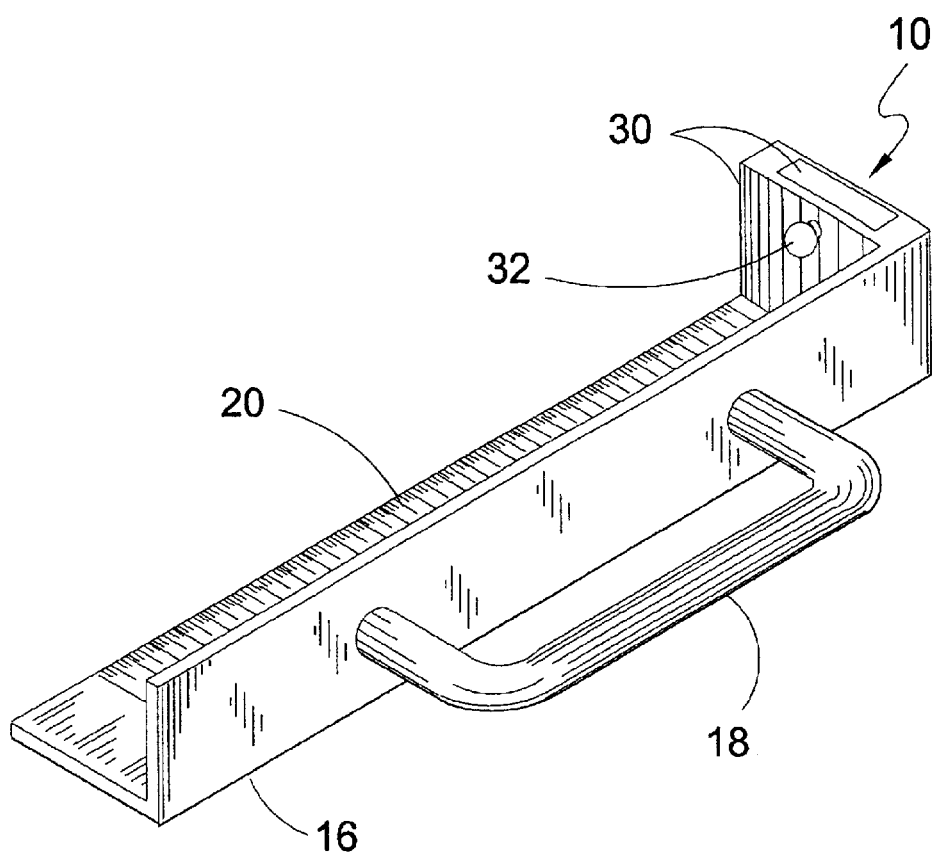
FIG. 4 is a rear perspective view of the present invention.

Turning to FIG. 4, shown therein is a rear perspective view of the present invention 10 in use. A handle 18 is provided as an attachment to the housing 16. The handle makes for easy carrying and manipulation of the device when using the weighting scale. Also shown are the measuring scale 20, nightlight 32, and weight read out display 30.

Figure 5:
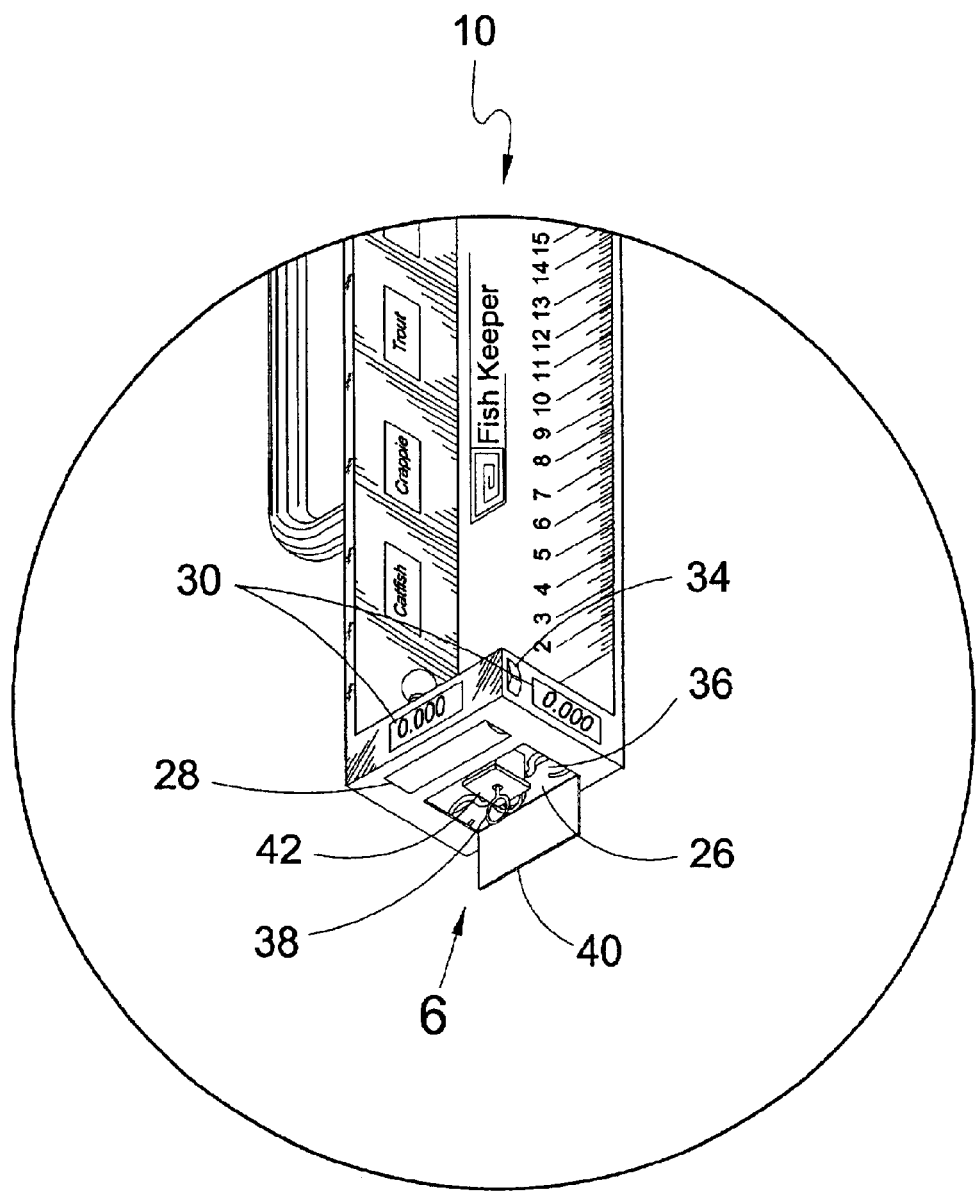
FIG. 5 is a detailed view of the present invention in use.

Turning to FIG. 5, shown therein is a detailed view of the present invention 10. The weighting scale of the present invention is located within the weighting scale 42 in compartment 26 with access door 40. Once opened, a weight hook device 36, that is also stored within the compartment, may be removed and attached to the holder loop 38. Other elements previously shown are also disclosed.

Figure 6:
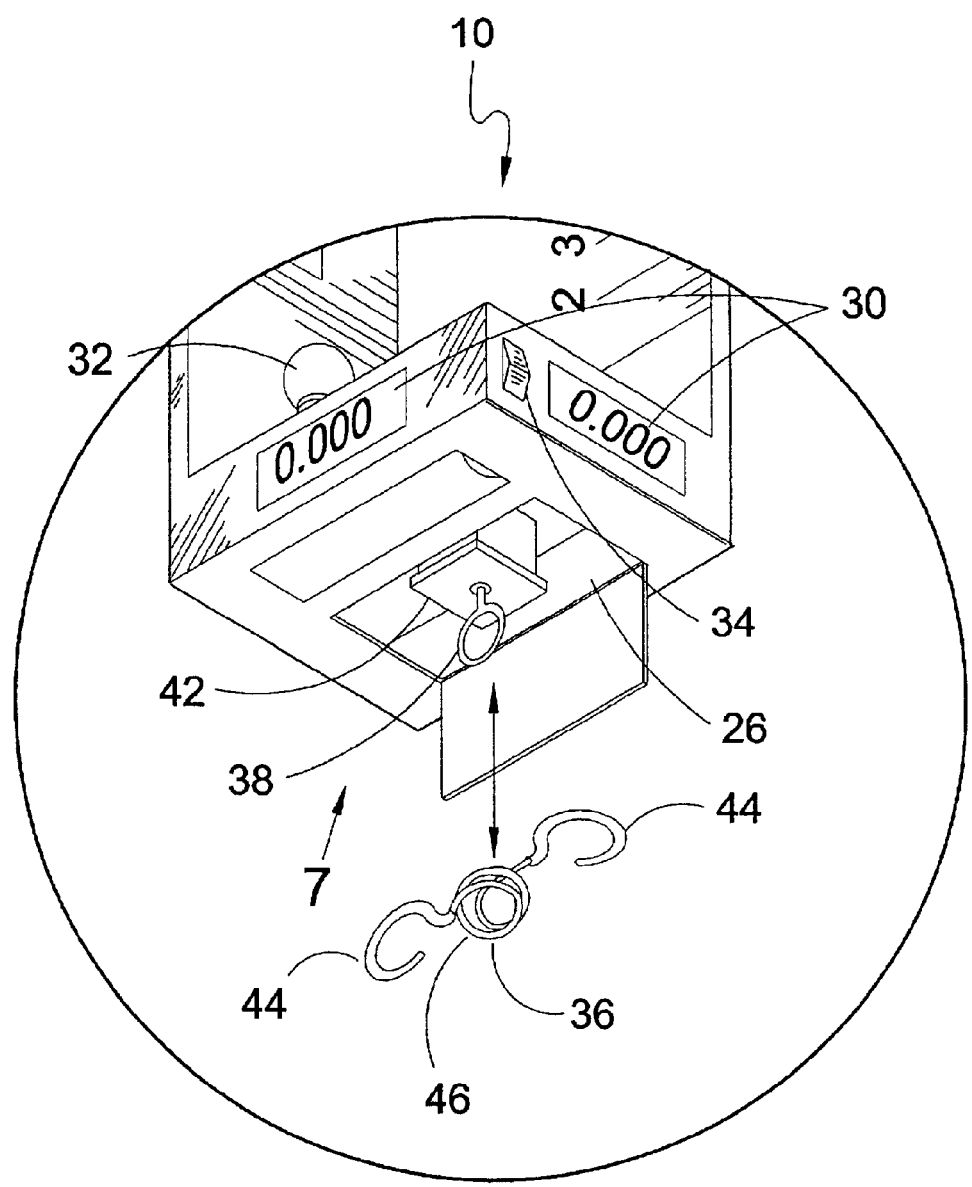
FIG. 6 is a detailed view of the present invention.

Turning to FIG. 6, shown therein is a detailed view of the present invention 10. When the weighting hook 36 of the present invention is removed as shown here from the scale compartment 26, it is then hooked, at one distal end, to the holder or scale loop 38, and at the other, to the user's catch, by means of a hook 44 provided at both distal ends of the hook line 46. When the catch is weighed the display 30 will show the weight in two places which make reading the display easy from different angles. Other elements previously disclosed are also shown.

Figure 7:
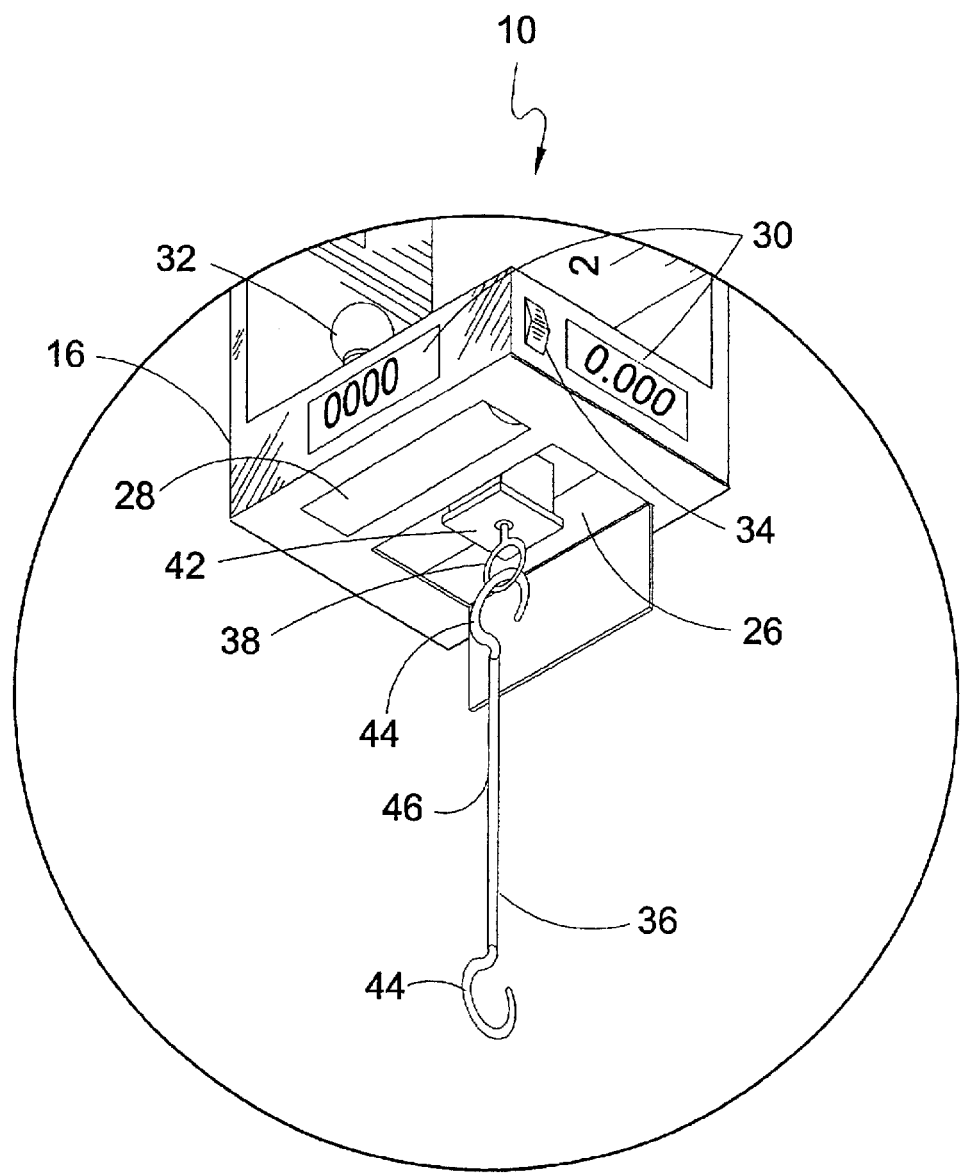
FIG. 7 is a detailed view of the present invention.

Turning to FIG. 7, shown therein is a detailed view of the present invention 10. Shown is the weighting scale hook 44 with line 46 attached to the scale loop 38 of weighing scale 42 and ready for use. Also shown the battery compartment 28 that stores the battery as a source of power for the nightlight 32. An on/off switch 34 to engage the nightlight is provided above the side wall display unit of the housing 16. Other elements previously disclosed are also shown.

Figure 8:
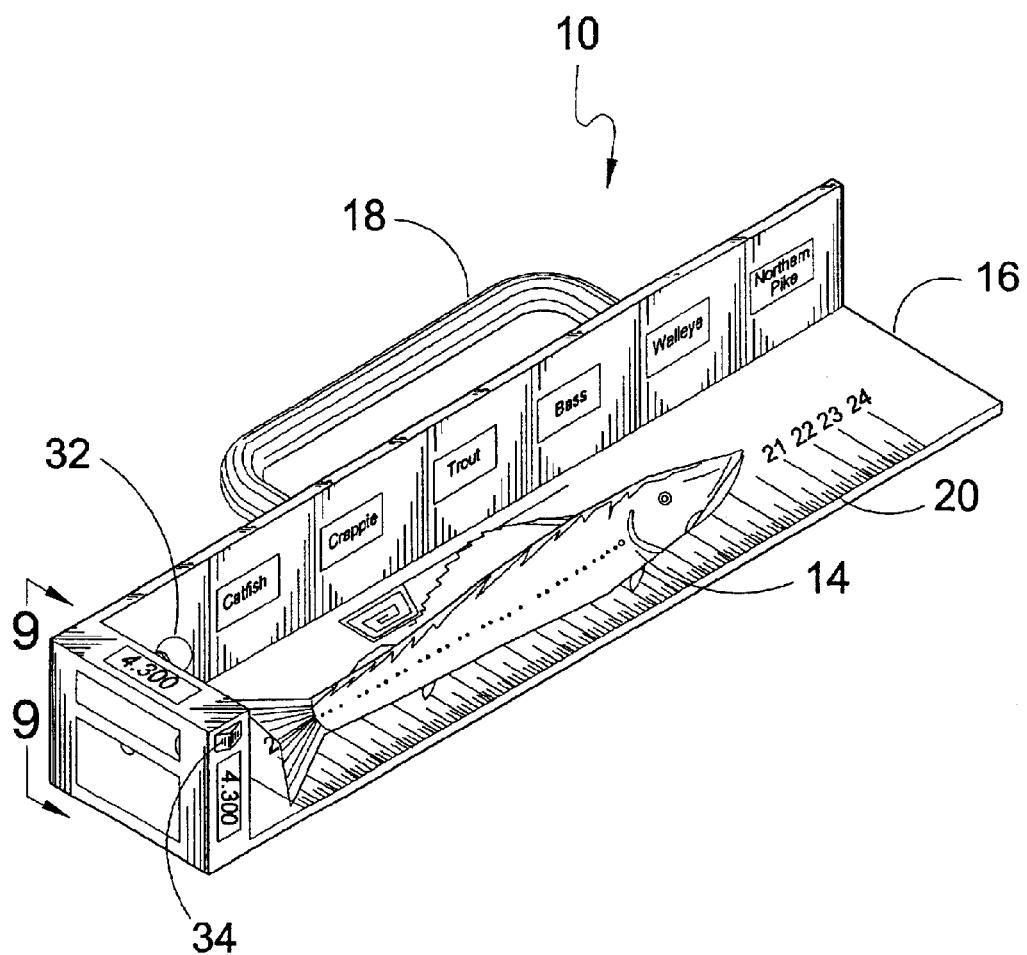
FIG. 8 is a perspective view of the present invention in use.

Turning to FIG. 8, shown therein is a perspective view of the present invention 10. The present invention is a device that allows a fisherman to measure and weight their catch 14 to determine if they are of legal size or a through back. The device consists of a plastic housing 16 with an attached handle 18 for easy manipulation of the device 10, nightlight 32, and switch 34, weight scale and measuring scale 20. It is a portable device that can be used on shore, on a dock or on a boat.

Figure 9:
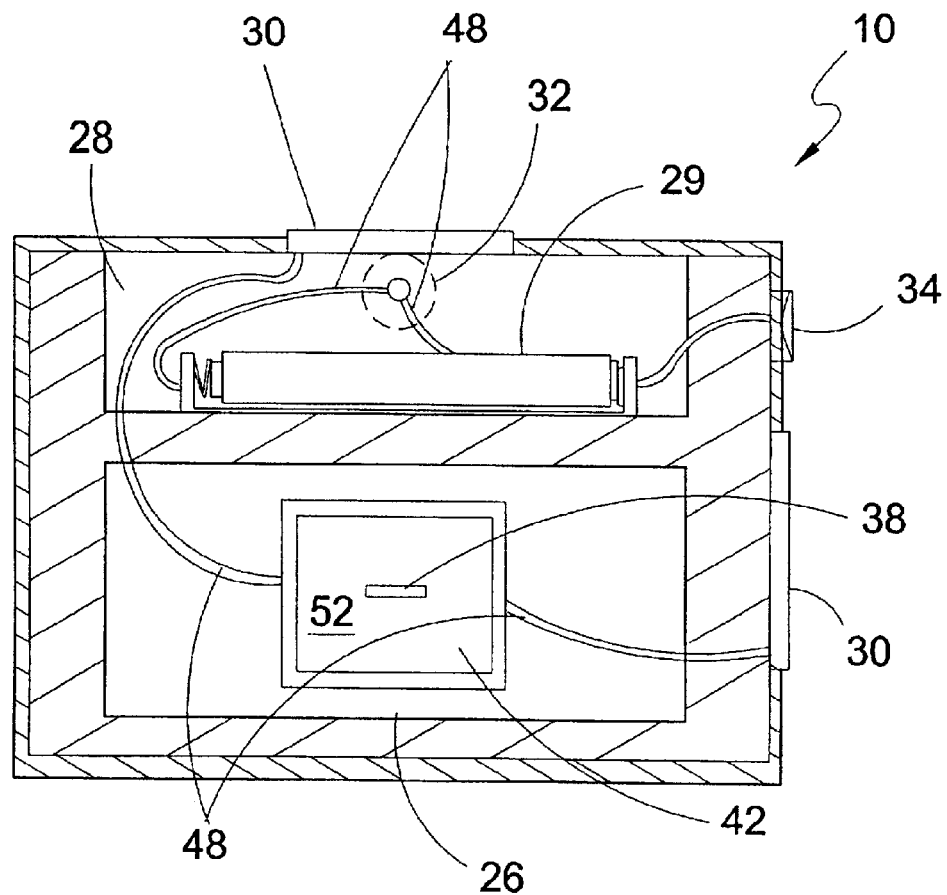
FIG. 9 is a sectional view of the present invention.

Turning to FIG. 9, shown therein is a sectional view of the present invention 10. The sectional view above shows the battery compartment 28 with the battery 29 within the provided holder, and wired 48 to the nightlight 32 and switch 34. Also shown are the weight scale 42 with the weight scale plate 52 and compartment 26 with wiring 48 to the display units 30. Other units previously disclosed are also shown.

Figure 10:
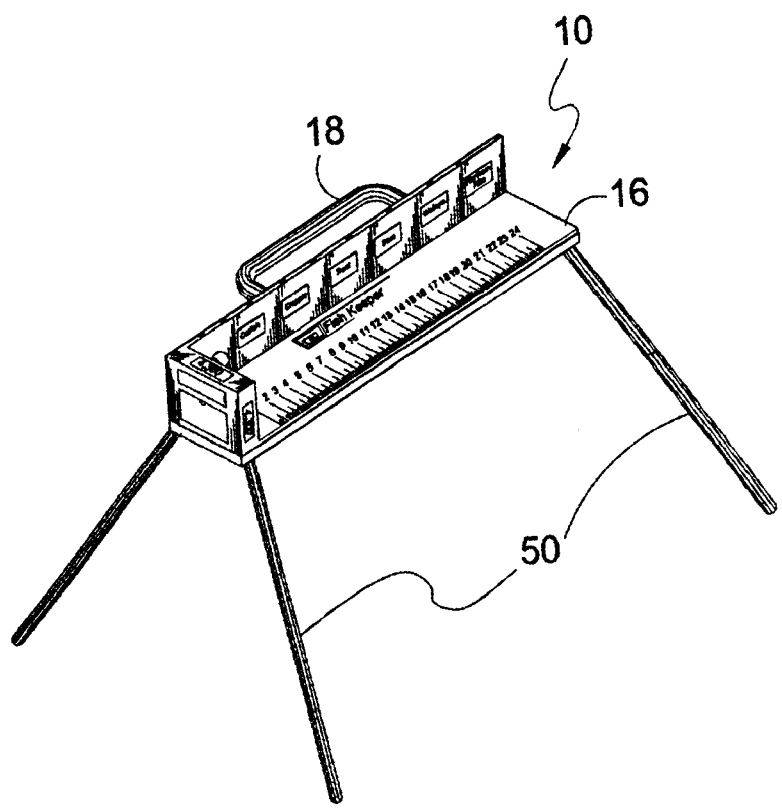
FIG. 10 is an alternate view of the present inventions provided legs.

Turning to FIG. 10, shown therein is an alternate view of the present invention 10 provided with a plurality of mounting legs 50. The present invention 10 can also be provided with adjustable legs 50 that may be attached or removed as required by the user. The legs 50 are mounted to the underside of housing 16 having handle 18 therein. Other elements are the same as has been previously described.

I claim:

1. An apparatus for weighing fish, comprising:
   a) a housing, said housing being L-shaped having a generally horizontal face and a generally vertical face thereon, said horizontal face having a first and second ends a topside and an underside, said vertical face having a frontside and a rearside;
   b) an end wall disposed on said first end of said housing, said end wall having an inner and outer face, and an upper edge and a front edge;
   c) a handle disposed on said rearside of said vertical face;
   d) a measuring scale disposed on said topside of said horizontal face for measuring a fish;
   e) means for weighing a fish disposed internal said end wall comprising a weighing scale, at least one weighing scale readout, and a weight hook device for attachment to a fish to be weighed whereby a fish can be weighed;
   f) means for lighting disposed on said end wall comprising a light bulb disposed on said inner face of said end wall, a switch disposed on said front edge of said end wall for controlling said light bulb, and a power supply for said light bulb and switch comprising a battery and a battery compartment disposed on said outer face of said end wall whereby a fish can be weighed in the dark;
   g) a plurality of pictorial indicia disposed on said frontside of said vertical face for providing information to a user; and
   h) a weigh scale compartment having an access door thereon disposed on said outer face of said end wall, said compartment containing said weighing scale and said weight hook device.

2. The apparatus of claim 1, wherein said weighing scale further comprises a weight scale plate disposed thereon, said weight scale plate having a holder loop attached thereto for receiving said weight hook device.

3. The apparatus of claim 2, wherein said weight hook device further comprises a line having a hook disposed on each end thereof.

4. The apparatus of claim 3, wherein one said hook attaches to said holder loop and a second said hook attached to a fish to be weighed.

5. The apparatus of claim 4, wherein said weighing scale readout further comprises a pair of readouts, one readout being disposed on said upper edge of said end wall and a second readout being disposed on said front edge of said end wall.

6. The apparatus of claim 5, further comprising a plurality of legs disposed on said underside of said housing on which legs the housing can stand.

7. The apparatus of claim 6, wherein said housing is made of plastic.

8. The apparatus of claim 7, wherein said line of said weight hook device further comprises a chain.

* * * * *